United States Patent Office

3,044,964
Patented July 17, 1962

3,044,964
CATALYST AND PROCESS OF MAKING
THE SAME
Jacque C. Morrell, 8 Oxford St., Chevy Chase, Md.
No Drawing. Filed Dec. 15, 1958, Ser. No. 780,272
10 Claims. (Cl. 252—435)

This invention relates to the manufacture and use of improved catalysts particularly of the solid granular type which are suitable for organic reactions generally, polymerizing reactions particularly, e.g. for the polymerization of gaseous olefins to produce liquid hydrocarbons.

This application is a continuation-in-part of my applications 784,516 filed November 6, 1947, now issued as Patent 2,586,852; 217,667 filed March 26, 1951, now issued as Patent 2,713,560; 272,890 filed February 21, 1952, and 395,839 filed December 2, 1953 both now abandoned; and of application 658,251 filed May 10, 1957 and now abandoned.

In one specific embodiment the present invention relates to the use of baked mixtures of phosphoric acids and porous silica materials particularly the naturally occurring substances known interchangeably as infusorial earth, kieselguhr and diatomaceous earth together with a minor proportion of china clay or kaolin for the treatment of olefin hydrocarbons to polymerize the same. The mixture of phosphoric acids together with the porous silica materials and kaolin are heated and dried or baked to bring about hardening by combined chemical reactions and removal of water; the kaolin particularly assisting in the hardening process. The phosphoric acids employed may comprise up to 75% and more of the final weight of the catalyst dependent upon the type catalyst desired and its use. As pointed out in the application of which this is a direct continuation-in-part, the catalysts with the lower percentages of phosphoric acid may be employed for reactions such as catalytic cracking and those with higher proportions for actions such as alkylation and polymerization. It is generally known in the art that for highest yields and/or rates of production of polymer, the highest percentages of phosphoric acid which can be incorporated in a suitable form with the mineral components consistent with stability, hardness and structural strength of the catalyst is most desirable. The latter properties determine the life of the catalyst and it is a prime purpose of the present invention to balance these desirable properties in my catalysts so as to obtain maximum economic returns as well as practical utility in the practice of my invention.

In the aforementioned application Serial No. 658,251, I applied my invention to the production of a series of catalysts for such widely different uses as catalytic cracking on one end of the scale to polymerization at the other end and alkylation in between. As pointed out on page 7 of the aforesaid application, the principal feature of my invention is the admixture of kaolin in various proportions in catalysts containing porous silica materials such as infusorial or diatomaceous earths and "that the resulting product is superior to such catalysts prepared either in the absence of kaolin or with kaolin and in the absence of the porous silica materials. Therefore my invention comprises the use of porous silica materials such as infusorial earth, silica gel and the like together with kaolin in admixture with phosphoric acid. The proportions used by me may vary from about 10% of the porous silica material and 90% of kaolin on the one hand to about 10% of the latter and 90% of the former, on the other hand." The mixtures containing high percentages of infusorial earth and the like (e.g. 80 to 90% of infusorial earth and 10 to 20% of kaolin based on the mineral components) are best adapted to simultaneously contain the higher percentages of phosphoric acid (60 to 85%) and are most suitable for polymerization catalysts. The reverse and intermediate types are most suitable for cracking and alkylation catalysts. The present form of my invention is specifically directed to the production of polymerization catalysts coordinating and correlating the components particularly as well as the conditions of preparation.

The phosphoric acids employed are preferably the orthophosphoric and/or pyrophosphoric acids or mixtures of the same; made up preferably by the addition in varying proportions of phosphorous pentoxide $P_2O_5$ to the commercial orthophosphoric acids of suitable concentrations to a thick syrupy consistency. This permits the incorporation of larger amounts of phosphoric acid while maintaining the proper consistency of the mixture before drying, baking or calcining.

The various well known phosphoric acids (ortho, pyro and meta, as well as less well known phosphoric acids such as tetraphosphoric acid which may be included) are related to each other in that they may be formed by successive dehydration steps and conversely they may be made from phosphorous pentoxide by successive additions of the proper amounts of water to $P_2O_5$. Also the latter may be added to various concentrations of orthophosphoric acid, e.g. from 75% to 85% and higher and the resulting mixture may be assumed (as has been done in the prior art to "contain free phosphorous pentoxide") that is to say that the latter has been added to the former. Alternatively the mixture may contain "a definite percentage of pyro acid corresponding to the primary phase of dehydration of the ortho acid" or corresponding to the primary phase of hydration of the pentoxide. The pyro acid itself may be used at a temperature above its melting point of 142° F. but this is less desirable than the mixture. Therefore, from the overall practical viewpoint and for convenience, I prefer to use the ortho acid starting for example with the 85% commercial concentration and diluting if desirable (e.g. 75 to 85%) to which has been added various proportions of $P_2O_5$; as found suitable or necessary simultaneously to incorporate the necessary amount of phosphoric acid in the mixture and to obtain a material of proper consistency prior to forming and baking.

The kaolin or china clay which may contain about 14% moisture or water in the natural state mixes readily with the more concentrated acids up to 100% orthophosphoric or above. The other mineral substances included in the mixture consist principally of the natural porous silicas, more specifically such as infusorial or diatomaceous earth (also sometimes referred to as kieselguhr) representing a natural porous silica material. Silica gel illustrating an artificial porous silica material may be employed under some conditions but the natural forms referred to are preferred. The heavy paste formed by mixing the mineral or inorganic materials with the phosphoric acid may be formed by extrusion or otherwise into suitable shapes and sizes, or may be sized later.

The formed catalyst is dried and/or baker at temperatures varying from about 500° F. to about 650° F. and higher for several hours and upwards depending on the time and temperature it is heated, the concentrations of acids, etc. This lower range may be employed by the special modifications which I disclose herein to produce the catalyst directed to low temperature quick hardening. I may, however, heat the catalysts progressively to high temperature in some cases, e.g. up to about 900° F. and for longer periods, e.g. up to four hours and more, especially where the product contains the maximum acid and porous silica content and the minimum or kaolin content. These latter high temperatures have been found necessary under these conditions in the absence of kaolin to obtain a stable product and which generally requires controlled rehydration. This is avoided in connection with my invention by a proper coordination of composition and baking conditions.

The relatively inert materials which may be used in my invention are china clay or kaolin (also sometimes referred to as kaolinite, which terms I shall employ alternatively in my invention) and materials of the porous silica type referred to above, particularly referred to as infusorial earth, kieselguhr and diatomaceous earths, and similar naturally occurring earths.

The terms infusorial earth, diatomaceous earth and kieselguhr (also tripolite) are used interchangeably for example in Hackh's Chemical Dictionary (1929) and all three terms are defined as a light earthy sedimentary rock consisting of the microscopic empty shells of diatoms. Infusorial earth, kieselguhr, diatomite, tripolite, diatomaceous earth—siliceous earth are similarly used interchangeably and referred to as —fine powder composed of siliceous skeletons of diatoms sp. gr. 0.24–0.34 in Chemical and Technical Dictionary (1947) and similarly in Chemical and Engineering Dictionary (both by Chemical Publishing Co.). The terms are likewise used interchangeably in Webster New Colligiate Dictionary (1951), (based on Webster's New International Dictionary); Practical Standard Dictionary (Funk and Wagnalls 1929); The Merck Index 1952 edition and others. The materials are likewise sold and used interchangeably under these several terms; the major portion of all of them up to as high as 90% generally being $SiO_2$ in the form of porous siliceous skeletal substances. Large deposits of these materials occur in various locations, e.g. California, Nevada, Oregon etc. and as with most naturally occurring materials, show variations within the general class. The terms infusorial earth, kieselguhr and diatomaceous earth and in general such naturally occurring porous siliceous materials will be used and referred to interchangeably and on an equivalent basis in general in connection with the present invention. Tests on various such products showed comparable results within the variations which might be expected, i.e. the presence of other substances in varying amounts besides the porous siliceous material in the several types.

China clay or kaolin which I employ in all of my mixtures in minor proportions is a unique material found in large quantities in nature (therefore cheap) and readily distinguishable from and having definite advantages over other materials including the other mineral or inorganic substances used herein with the kaolin. In this connection, I am aware of the prior art which discloses the use of phosphoric acid as a polymerizing agent and of the patents to Ipatieff and others which have disclosed the use of phosphoric acid with minerals of a siliceous character such as infusorial earth, kieselguhr and the like. However, the use of china clay or kaolin alone with phosphoric acid or together with the porous silica materials disclosed in my related applications referred to above and herein as a continuation-in-part has never been disclosed, by others, and the catalysts prepared from the mixtures described herein have shown highly superior properties and results compared to those of the prior art. Particularly none of the materials of the prior art has the desirable properties of china clay or kaolin to improve and modify the hardness, structural strength and wearing qualities of catalysts containing both phosphoric acid and the natural porous silica materials of the infusorial earth type as disclosed by my invention.

China clay or kaolin sometimes referred to as alba or white bole, terra bole, argilla or porcelain clay is a natural plastic material of remarkably high uniformity in characteristics and properties. It is composed of silicon, oxygen and hydrogen corresponding to the general formula: $Al_2O_3 \cdot 2SiO_2 \cdot 2H_2O$. Its origin is from the weathering of feldspars.

The plasticity of kaolin and its hardening characteristics are outstanding among all the mineral and morganic materials which have been compared with it. These properties are attributable notably to the interlocking of the characteristic minute crystals of which kaolin is composed as well as chemical changes as indicated by low temperature transition points which is unique for kaolin, and the loss of water on heating. I have found in this connection that despite similarities in chemical composition of certain natural clays and earths the products produced from them when they are admixed with phosphoric acid and baked at an elevated temperature showed widely different properties (particularly with respect to hardness, structure and fracture) and the results are generally unpredictable. In all cases admixture of the natural porous silica with kaolin produced a superior product and showed distinct advantages over any of the other materials used separately or in admixture with each other particularly from the viewpoint of structural strength, hardness and wearing qualities.

I have discovered in connection with the present invention that when kaolin is employed in the preparation of catalysts containing phosphoric acids as described, and also containing natural porous silica substances particularly infusorial or diatomaceous earth or kieselguhr referred to above, when the latter are admixed with kaolin in various proportions that the resulting product is superior to such catalysts prepared either in the absence of kaolin or with kaolin and in the absence of the porous silica materials. This is the principal feature and the basis of my present invention. More specifically, when various proportions of kaolin are mixed with the porous silica materials referred to above, and these materials are then admixed with a phosphoric acid and dried or baked as described, the product is more satisfactory and far superior to that made from any of these minerals without kaolin. Also the porosity of the product is improved when compared with kaolin alone and without excessive weakening of the structure. Therefore my invention comprises the use of porous silica materials such as infusorial earth (diatomaceous earth and kieselguhr) and the like together with kaolin in admixture with phosphoric acid. The proportions used by me (as disclosed in my application 658,251) may vary from about 10% of the porous silica material and 90% of kaolin on the one hand to about 10% of the latter and 90% of the former, on the other hand minimum kaolin and maximum porous silica contents are used herein.

The normal time and temperature of baking (3 to 4 hours at 500 to 650° F.) must generally be increased with increase in the acid (e.g. from 75% to 85%) and porous silica component especially where the kaolin in admixture with the latter is kept at a minimum, e.g. 10% or lower of the mineral mixture. In this case the temperature range used will be from 650° F. to 900° F. the latter temperature being generally required in the absence of any kaolin.

Concentrations of orthophosphoric acid from approximately 75% to 100% (preferably 75% to 85%) or mixtures thereof with pyrophosphoric acid together or with phosphorous pentoxide are preferred for the polymerizing catalysts. Preferably all of the catalysts may be made with various concentrations of phosphoric acid, e.g. 75 to 85% to which has been added varying amounts of $P_2O_5$ as required. The latter dissolves in the orthophosphoric acid even in large proportions on heating the mixture. (Metaphosphoric, tetraphosphoric and in general a phosphoric acid in which phosphorous has a valence of 5 may be employed also.) These may be mixed with the admixture of infusorial earth, kieselguhr or diatomaceous earth and china clay (kaolin) preferably adding sufficient phosphoric acid to the mineral mixture to obtain the desired concentration and amount thereof while permitting further treatment of the mixture such as forming (by extrusion, etc. and cutting to size) and heating or baking to dry the same. The product may also be baked or dried first and then broken and graded to size. The relative amounts of kaolin (employing minimum quantities) together with the other mineral components (i.e. the infusorial earth, kieselguhr etc.) on the one hand and phosphoric acid on the other hand may vary generally with respect to the latter up to 75% and higher generally from 60 to 85% preferably employing the higher proportions of the acid with pyrophosphoric acid, and most preferably with mixtures of orthophosphoric and $P_2O_5$.

The mixture of the phosphoric acid on the one hand and china clay or kaolin and porous silica minerals referred to herein on the other hand may be made up to a paste of varying consistency depending on the temperature of mixing, relative proportions of the kaolin and other minerals and the phosphoric acid and the kind and concentration of the latter. It is desirable in all cases, however, that the proportions of the materials be adjusted so that the mixture is stiff enough to be formed by extrusion and baked without too much deformation. The application of a relatively small amount of heat after mixing rapidly thickens and congeals the mixture if necessary to permit forming, although this may generally be avoided by proper formulation. The mixture may be formed into pellets, or it may be extruded and cut into suitable lengths of generally cylindrical or other shapes, e.g. 1/8" to 1/4" diameter and about 1/4" length, or broken up into the desirable sizes after drying or baking. The latter process is carried out at about 500° F. to about 650° F. or higher for several hours or longer especially when minor proportions of kaolin relative to the porous silica material are employed and the percentage of acid ranges from 75% to 85%. This is referred to as the drying or baking temperature. When larger proportions of the porous silica materials and phosphoric acid are used, higher temperatures in the range of 650 to 900° F. for longer periods are preferred; but on the lower side of this range.

When used for polymerizing normally gaseous olefins, the granules or particles of catalyst are generally placed in treating towers and the gases containing olefins are passed downwardly through the towers at temperatures of 400 to 500° F. and pressures of several hundred pounds, e.g. 100 to 350 lbs. per square inch when employing stabilizer refluxes which contain e.g. 10 to 35% of propene and butenes. With gas mixtures containing normal and isobutene to obtain mixed polymerization the temperature may be lower, e.g. 250 to 350° F. with pressure of 500 to 800 lbs. per square inch, other reactions may be similarly carried out. It may also be desirable to introduce some steam during the reaction to maintain the normal vapor pressure of the catalyst; or the gas may be saturated with water vapor.

To remove carbonaceous or hydrocarbonaceous materials which form and deposit during the treatment the catalysts are reactivated by superheated steam and/or air or oxygen at temperatures varying from 500° to 1000° F. dependent on the concentrations of oxygen. The steam concentration may be increased toward the end of the burning off period and then both steam and temperatures may be decreased toward the very end.

In the specific examples which were presented in application Serial No. 658,251 to illustrate the polymerization catalyst aspects of my invention, of particular interest were Examples 3(b) and 4(b) which may be restated: In Example 3(b) 60% by weight of a mixture (of phosphoric acids) containing pyrophosphoric acid and $P_2O_5$ (added as such) and 40% of a mixture containing 20% of kaolin and 80% infusorial earth were admixed and extruded (3/16" diameter die and cut into lengths of about 1/4"). The material was dried at a temperature in the range of from 575° F. to 650° F. for several hours. The product was more porous and less dense than it was when the proportions of kaolin and infusorial were reversed, and it was much superior to the use of infusorial earth and phosphoric acid in wearing and handling qualities.

In Example 4(b) run number 3b was repeated excepting that the phosphoric acid component was prepared from othophosphoric acid to which phosphorous pentoxide was added. 65% of this mixture was employed and 35% of a mixture of the solid mineral components containing infusorial earth and kaolin in the proportions of 80% of the former and 20% of the latter. (This may be accomplished by using 65 parts of 85% orthophosphoric acid to which has been added 17 parts of $P_2O_5$ and admixing this with 34 parts of infusorial earth and 8.5 parts of kaolin, all by weight. The final product would thus contain the equivalent of 65% of (100%) phosphoric acid; 28% of infusorial earth and 7% of kaolin.) As pointed out, very good results were obtained in these mixtures.

SPECIFIC EXAMPLES:

The following specific examples are typical of the proportions of materials used and the properties of the resulting products although they should not be construed as limiting.

Table I [1]

| | Mixture (Parts by Weight) | | Formula (Percentage Composition) |
|---|---|---|---|
| (1) | 85% $H_3PO_4$ | 65.0 | 65% (of 100% $H_3PO_4$ Equivalent). |
| | $P_2O_5$ | 17.0 | |
| | Infusorial earth (kieselguhr or diatomaceous earth) | 34.0 | 28 |
| | Kaolin (approximately 20% of mineral mix) | 8.5 | 7 |
| | | | 100.0% |
| (1a) | Example 1 repeated employing 4.2 parts of kaolin, i.e. about 10% on mineral mix and 3.5% on entire mixture. | | |
| (2) | 85% $H_3PO_4$ | 63.5 | 60.5% (of 100% $H_3PO_4$ Equivalent). |
| | $P_2O_5$ | 8.0 | |
| | Infusorial earth, kieselghur or diatomaceous earth | 34.0 | 31.5 |
| | Kaolin (approximately 20% of mineral mix) | 8.5 | 8.0 |
| | | | 100.0% |
| (3) | 85% $H_3PO_4$ | 80.0 | 75.5% (of 100% $H_3PO_4$ Equivalent). |
| | $P_2O_5$ | 18.8 | |
| | Infusorial earth, kieselguhr or diatomaceous earth | 30.0 | 24.5 |
| | Kaolin—none | | |
| | | | 100.0% |
| (4) | 85% $H_3PO_4$ | 81 | 75.0% (of 100% $H_3PO_4$ Equivalent). |
| | $P_2O_5$ | 21 | |
| | Infusorial earth, kieselguhr or diatomaceous earth | 26.4 | 20.0 |
| | Kaolin (approximately 20% of mineral mix) | 6.6 | 5.0 |
| | | | 100.0% |
| (4a) | Example (3) repeated employing 3.3 parts of kaolin, i.e. about 10% on mineral mix and 2.5% on entire mixture. | | |
| (5) | 85% $H_3PO_4$ | 68.0 | 80.5% (of 100% $H_3PO_4$ Equivalent). |
| | $P_2O_5$ | 37.5 | |
| | Infusorial earth, kieselguhr or diatomaceous earth | 26.5 | 19.5 |
| | Kaolin—none | | |
| | | | 100.0% |
| (5a) | Same mixture and formula as (5). | | |

[1] The composition of phosphoric acid is shown for comparison in terms of 100% of the latter although the final form in the catalyst may be in a state of greater dehydration.

Table I—Continued

| | Mixture (Parts by Weight) | | Formula (Percentage Composition) |
|---|---|---|---|
| (6) | 85% $H_3PO_4$ | 68.0 | 79.0% (of 100% $H_3PO_4$ Equivalent). |
| | $P_2O_5$ | 37.5 | |
| | Infusorial earth, kieselguhr or diatomaceous earth | 26.5 | 18.9 |
| | Kaolin (approximately 10% of mineral mix) | 3.0 | 2.1 |
| | | | 100.0% |
| (7) | 85% $H_3PO_4$ | 71.5 | 79.0% (of 100% $H_3PO_4$ Equivalent). |
| | $P_2O_5$ | 38.0 | |
| | Infusorial earth, diatomaceous earth or kieselghur | 24.5 | 17.1 |
| | Kaolin (approximately 20% of mineral mix) | 5.5 | 3.9 |
| | | | 100.0% |
| (7a) | Same mixture and formula as (7) heated to a higher temperature to show effect on hardness and strength for comparison. | | |

All of the mixtures shown in Examples 1 to 4a inclusive and 7 were heated for a period of about 3½ to 4 hours at a temperature range of 575° F. to 650° F. The product from Example 5 (80% acid and no kaolin added) when treated under these conditions crumbled so readily after standing for several hours that it was heated to about 750° F. for an additional hour. 7a containing approximately 4% kaolin (20% of mineral mix) was tested similarly for comparison.

The following table (II) illustrates the characteristics of my improved polymerization catalysts particularly with respect to structural strength and hardness (resistance to abrasion) both of which are indexes of the wearing qualities and hardness. The structural or compressive strength tests represent the total thrust in pounds using the proving ring method on prepared representative specimens of fairly uniform size and shape (approximately ⅝" cube) and represent the average of several compartive determinations on each type. The hardness data were made employing the Mohs mineral scale which is conventional in determining the relative hardness of materials. The activity data are those which may be obtainable by conventional methods under comparable and controlled experimental conditions in the polymerization of propylene. (The number 5 catalyst shown in the table is a standard type in composition and activity for which under the conditions of test values of 80 to 90 have been reported.) All of these data are relative to facilitate comparison. However, they are strictly comparable and illustrate the differences in the catalysts with and without the addition of kaolin.

ing qualities, i.e. the compressive (structural) strength and hardness (resistance to abrasion) of the various catalysts.

The addition of kaolin in the proportions used diminishes the activity of the catalysts on a comparable basis only slightly in comparison with the large improvements in compression (or structural strength) and hardness (or resistance to attrition). The latter greatly prolong the life of the catalyst to the extent of a large economic gain as a result of greatly increased resistance to breakage and attrition in the use and handling of the catalyst.

The loss in activity on a comparable basis is very small from the practical viewpoint and can be made up by the use of an additional several percent of phosphoric acid at each level of concentration of the latter, e.g. 77% instead of 75%, 82% instead of 80% and so forth.

Increased proportions of kaolin (e.g. up to 30% or 40% of the mineral mix, i.e. the kaolin and porous silica) which is still less than 10% on the total composition would give further improvements in hardness and structural strength and could be considered for special cases but generally might not justify increased acid and other requirements for the high acid (75% to 85%) type of polymerization catalysts. On the other hand, while I have disclosed in my application 658,251 a kaolin content as low as 10% based on the mineral mix (which is several percent only on the total) the use of added kaolin in percentages considerably lower than this, e.g. 1 to 5% of the mineral mix, while not normally used show beneficial effects and therefore constitute a part of my invention for special cases on a non-equivalent basis.

As an example of kaolin content in the range of 30%–40% (more specifically 33%) based on the mineral mix a test was made employing 12 parts of kaolin, 24 parts of infusorial earth (kieselguhr etc.) and 63.5 parts of 85% $H_3PO_4$. (This recalculates to 74.5% of $H_3PO_4$ (100%) 17% of infusorial earth and 8.5% of kaolin on the resulting product.) The resulting relative properties on a basis of comparison in Table II were: hardness 2-3; crushing strength 220 lbs. and activity about 88.

The porosity of the various products as viewed under 5-10 power magnification was generally excellent; and in general improves with increased content of phosphoric acid and porous silica contents. The limiting factor on this important factor is the crushing strength.

With regard to temperatures and time of heating, I have found that generally 3 to 4 hours at 500° F. to 650° F. are sufficient when kaolin is added. When higher concentrations of phosphoric acid are used, e.g. 75% to 85% (using high silica and low kaolin contents at the same time) somewhat higher temperatures and longer times

Table II

| Test No. | Percent $H_3PO_4$ (100% Equiv.) | Percent Infusorial Earth (kieselguhr or diatomaceous earth) | Percent Kaolin | | Relative | | | Catalyst Life Index $(a) \times (b)$ / 100 |
|---|---|---|---|---|---|---|---|---|
| | | | In Mineral Mix | In total Mix | Compression Strength (a) | Hardness (b) | Activity | |
| 1 | 65.0 | 28.0 | 20 | 7.0 | 175 | 3.5 | 77 | 6.0 |
| 2 | 60.5 | 31.5 | 20 | 8.0 | 250 | 3.5 | 72 | 8.7 |
| 3 | 75.5 | 24.5 | None | None | 15 | <1.0 | 93 | <0.2 |
| 4 | 75.0 | 20.0 | 20 | 5.0 | 200 | 3.0 | 90 | 6.0 |
| 4a | 74.0 | 23.6 | 10 | 2.6 | 150 | 2.0 | 90 | 3.0 |
| 5 | 80.5 | 19.5 | None | None | 10 | <1.0 | 100 | 0.1 |
| 5a [1] | 80.5 | 19.5 | None | None | 35 | 1.0+ | | 0.4+ |
| 6 | 79.0 | 18.9 | 10 | 2.1 | 80 | 1.5 | 97 | 1.2 |
| 7 | 79.0 | 17.1 | 20.0 | 3.9 | 125 | 1.5 | 96 | 1.9 |
| 7a [1] | 79.0 | 17.1 | 20.0 | 3.9 | 250 | 2.0 | | 5.0 |

[1] Illustrates effect of heating at higher temperature and longer (1 hour additional at 750 to 800° F.) on hardness and compressive strength.

Table II shows the marked beneficial effect of kaolin when employed in relatively small quantities on the wearing may be desirable, e.g. in the lower part of range of 750° F. to 900° F. When kaolin is omitted in such cases the highest temperature (around 900° F.) and greatly prolonged periods of heating are mandatory to produce a desirable product and even so rehydration must be resorted to. Increase in temperature and time especially in the highest range increases the hardness and strength of the catalyst in all cases within limits but aside from the increased cost of this procedure the product when heated to 900° F. for example for 16 hours as the prior art shows must be rehydrated by prolonged steam treatment to regain activity and in doing so loses some of the desirable properties in hardness and strength so gained; which is avoided by the use of my invention.

With the use of kaolin even when employing the higher proportions of phosphoric acid (75 to 85%) and correspondingly high infusorial earth (kieselguhr or diatomaceous earth), temperatures within the range of 550 to 750° F. for about 4 hours have proven satisfactory without the necessity of rehydrating and with the elimination in the additional costs otherwise.

It will be observed that I correlate the percentages of phosphoric acid, infusorial earth (or kieselguhr, etc.) and kaolin on the one hand and temperature of baking on the other as described, i.e. the catalysts with higher acid contents give best results with less kaolin on the total mix and require somewhat higher temperatures of drying or baking for the most satisfactory products.

It will be understood that there are variations in the concentration of phosphoric acid, e.g. 75% to 85% and higher as well as the percentages and amounts of phosphorous pentoxide which may be incorporated therein whereby one may obtain a satisfactory mixture with the infusorial earth, kieselguhr etc. and the kaolin of the proper consistency to be extruded and dried or baked without being deformed. However, these initial concentrations of phosphoric acid and amounts of $P_2O_5$ and of the mineral components are within narrow enough limits for each concentration of phosphoric acid in the final catalyst product to be readily ascertained by trial and experience. Also it must be understood that there are many possible variations in composition of raw materials and of the final product and of conditions generally; and therefore I do not desired to be limited except within the broad spirit and scope of my invention.

I claim:
1. A polymerization catalyst comprising a dired mixture of a phosphoric acid and an inorganic support, said support consisting of a natural porous silica material selected from the group consisting of infusorial earth, diatomaceous earth and kieselguhr and added kaolin, the said phosphoric acid comprising about 60% to 85% of the said mixture, said support comprising not less than about 60% of the said porous silica material and less than about 40% and more than 1% of said kaolin, said support being further characterized in that the said porous silica material together with the kaolin comprises not more than about 40% of the mixture.

2. A polymerization catalyst comprising a dried mixture of a phosphoric acid and an inorganic support, said support consisting of a natural porous silica material selected from the group consisting of infusorial earth, diatomaceous earth and kieselguhr and added kaolin, the said phosphoric acid comprising about 75% to 85% of the said mixture, said support comprising not less than about 60% of the said porous silica material and less than about 30% and more than about 5% of said kaolin, said support being further characterized in that the said porous silica material together with the kaolin comprises not more than about 25% of the mixture.

3. A polymerization catalyst comprising a dried mixture of a phosphoric acid and a mineral support, said support consisting of a material selected from the class consisting of infusorial earth, kieselguhr and diatomaceous earth and added kaolin, the said phosphoric acid comprising about 60% to 85% of the said mixture, said support comprising not less than about 60% of the said material selected from the class consisting of infusorial earth, kieselguhr and diatomaceous earth and less than about 40% and more than 1% of said kaolin, said support being further characterized in that the said material selected from the class consisting of infusorial earth, kieselguhr and diatomaceous earth together with the kaolin comprises not more than about 40% of the mixture.

4. A polymerization catalyst comprising a dried mixture of a phosphoric acid and a mineral support, said support consisting of a material selected from the class consisting of infusorial earth, kieselguhr and diatomaceous earth and added kaolin, the said phosphoric acid comprising about 75% to 85% of the said mixture, said support comprising not less than about 60% of the said material selected from the class consisting of infusorial earth, kieselguhr and diatomaceous earth and less than about 30% and more than about 5% of said kaolin, said support being further characterized in that the said material selected from the class consisting of infusorial earth, kieselguhr and diatomaceous earth together with the kaolin comprises not more than about 25% of the mixture.

5. A process for the production of a polymerization catalyst which comprises mixing a phosphoric acid and a mineral support said support consisting of a major amount of a material selected from the class consisting of infusorial earth, kieselguhr and diatomaceous earth and a minor amount of added kaolin, said phosphoric acid comprising about 65% to 85% of the said mixture, drying the said mixture by heating the same to a temperature of 600° F. to 750° F. in a manner such that the temperature of drying is correlated with the percentage of phosphoric acid in the mixture so that as the latter is increased from 65% to 85% the temperature is raised progressively above 600° F. to 750° F.

6. An improved polymerization catalyst comprising a dried mixture of a phosphoric acid and an inorganic support, the said phosphoric acid comprising about 65% to 85% of the said mixture, and said support consisting essentially of a porous natural silica material selected from the group consisting of infusorial earth, diatomaceous earth and kieselguhr and added kaolin, the said kaolin being present in an amount of about 10% to 33% of the said inorganic support.

7. An improved polymerization catalyst comprising a dried mixture of a phosphoric acid and an inorganic support, the said phosphoric acid comprising about 65% to 85% of the said mixture, and said support consisting essentially of a porous natural silica material selected from the group consisting of infusorial earth, diatomaceous earth and kieselguhr and added kaolin, the said kaolin being present in an amount of about 10% to 33% of the said inorganic support and less than about 15% of the total mixture.

8. An improved polymerization catalyst comprising a dried mixture of a phosphoric acid and an inorganic support, the said phosphoric acid comprising about 65% to 85% of the said mixture, and said support consisting essentially of a porous natural silica material selected from the group consisting of infusorial earth, diatomaceous earth and kieselguhr and added kaolin, the said kaolin being present in an amount of about 10% to 33% of the said inorganic support and less than about 10% of the total mixture.

9. An improved polymerization catalyst comprising a dried mixture of a phosphoric acid and an inorganic support, the said phosphoric acid comprising about 65% to 85% of the said mixture, and said support consisting essentially of a porous natural silica material selected from the group consisting of infusorial earth, diatomaceous earth and kieselguhr and added kaolin, the said kaolin being present in an amount of about 10% to 33% of the said inorganic support, and the remainder consisting essentially of the said porous natural silica material.

10. An improved polymerization catalyst comprising a dried mixture of a phosphoric acid and an inorganic support, the said phosphoric acid comprising about 65% to 85% of the said mixture, and said support consisting essentially of a porous natural silica material selected from the group consisting of infusorial earth, diatomaceous earth and kieselguhr and added kaolin, the said kaolin being present in an amount of about 10% to 33% of the said inorganic support and less than about 15% of the total mixture, the said phosphoric acid comprising about 60% to 85% of the total mixture and the remaining component of the said catalyst consisting essentially of said porous natural silica material.

References Cited in the file of this patent

UNITED STATES PATENTS

| | | |
|---|---|---|
| 2,275,182 | Ipatieff | Mar. 3, 1942 |
| 2,586,852 | Morrell | Feb. 26, 1952 |
| 2,713,560 | Morrell | July 19, 1955 |